Feb. 10, 1948.  G. J. CARSON  2,435,737
MAGNETIC CHUCK TOP PLATE
Filed Aug. 7, 1944  2 Sheets-Sheet 1

INVENTOR.
GEORGE J. CARSON
BY Charles R. Fay
atty.

Feb. 10, 1948.   G. J. CARSON   2,435,737
MAGNETIC CHUCK TOP PLATE
Filed Aug. 7, 1944   2 Sheets-Sheet 2
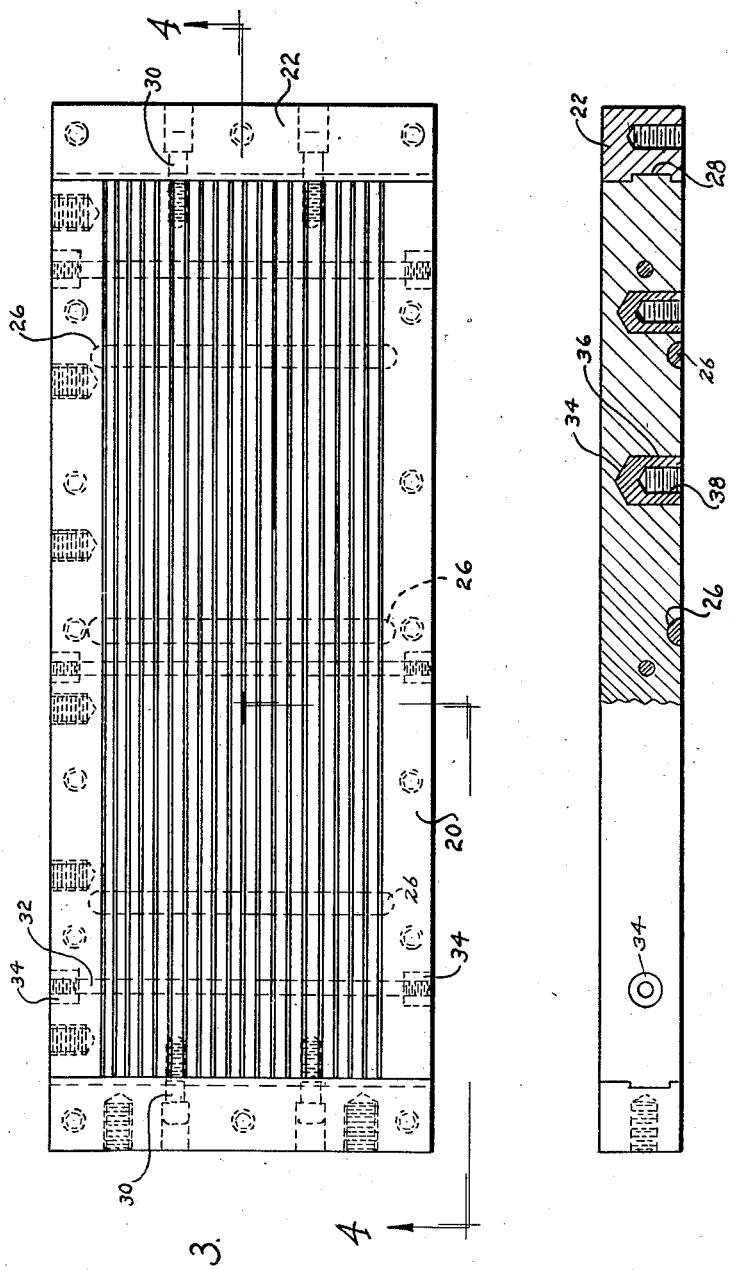
INVENTOR.
GEORGE J. CARSON Patented Feb. 10, 1948

2,435,737

UNITED STATES PATENT OFFICE 2,435,737

MAGNETIC CHUCK TOP PLATE

George J. Carson, Worcester, Mass., assignor to O. S. Walker Company, Inc., a corporation of Massachusetts Application August 7, 1944, Serial No. 548,421

2 Claims. (Cl. 175—367)

This invention relates to magnetic chucks whether of the permanent magnet or electromagnetic type.

The principal object of the invention resides in the provision of an improved top plate which forms an integral part of the chuck and is adapted to transmit flux directly from the magnetic source in the chuck body to the work.

Further objects of the invention include the provision of a top plate for a chuck, said top plate being of the bar pole type and comprising a series of longitudinal pole plates extending substantially the length of the chuck, said pole plates being separated by non-magnetic gaps, there being a plurality of slots transverse to the lengths of the poles and gaps, said slots appearing at the bottom of the plate and being filled with non-magnetic material such as, for instance, brazed brass, for the purpose of permanently holding together all of the poles and gaps so that the poles and gaps form a unitary body in and of themselves; the provision of a chuck top plate as above stated including a pair of steel side pieces extending the length of the poles and a pair of brass or other non-magnetic end pieces which complete the top plate and which are secured by bolts or other like means to the unitary bar pole top plate.

Other objects and advantages of the invention will appear hereinafter.

Reference is to be had to the accompanying drawings, in which

Fig. 3 is a top plan view of the top plate; and

Fig. 4 is a section on line 4—4 of Fig. 3.

Figure 1:
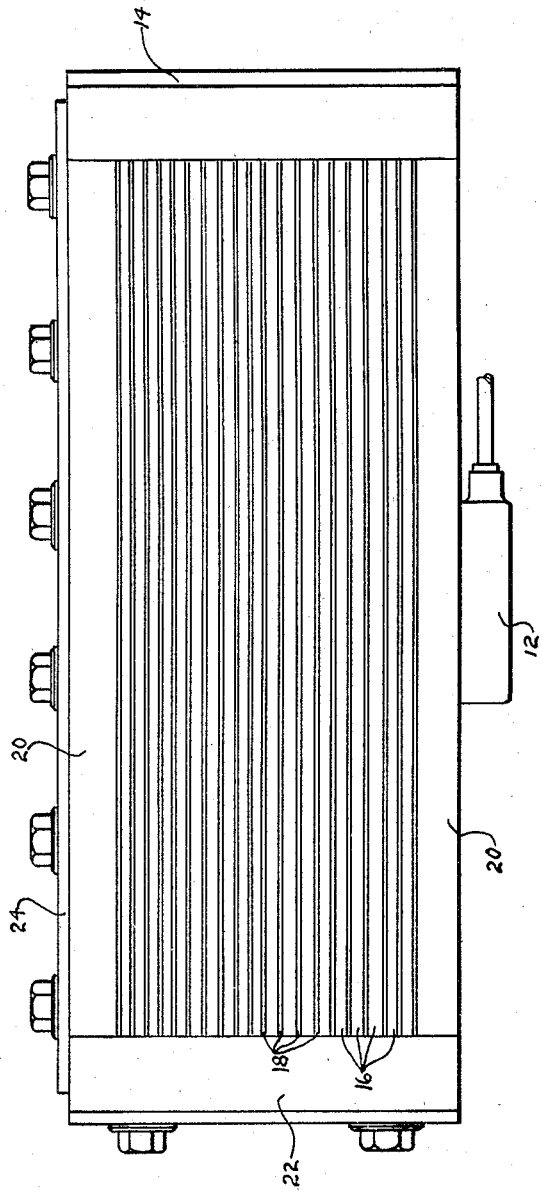
Fig. 1 is a top plan view of a chuck provided with a top plate according to the present invention.
Figure 2:
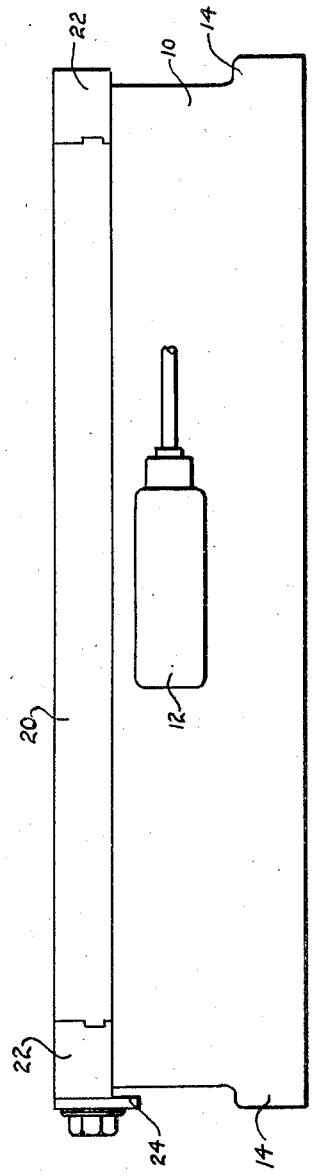
Fig. 2 is a view in side elevation of the same.

The present chuck is illustrated as being provided with a housing 10 including the magnetic source which may be a permanent magnet or which may be electric coils. In the case of an electric chuck a conduit 12 would be used. The housing 10 provides a bottom, side walls, and end walls for the chuck and may have lugs 14 for securement to the bed of a machine. The top plate to which the present invention is mainly directed rests upon the open upper side of the housing 10 and may be secured to the housing as will appear hereinafter.

The top plate is made up of a series of soft iron poles 16 which are in the form of elongated plates as shown and which extend for substantially the length of the chuck. The soft iron poles 16 are separated or spaced by means of gaps 18 which in the present instance are preferred to take the form of thin non-magnetic strips. A pair of side pieces of soft iron are arranged to lie at the long sides of the top plate as at 20, the side pieces being of a length to correspond to that of the poles. Non-magnetic end pieces 22 are provided and these end pieces overlap the narrow ends of the assembled poles and conform in length to the width of the chuck. Back strips and end strips 24 may be adjustably secured to the chuck as by bolts or other desired means.

A plurality of slots as at 26 are milled transversely of the poles 16 and non-magnetic strips 18, these slots appearing only at the lower side of the top plate. The slots 26 are filled with non-magnetic material such as brazing brass in order to hold the poles on the brass strips in a single unitary body. If desired, the brazing brass may extend slightly into the side pieces 20 so as to insure that the end brass strips 18 are held to the top plate.

It will be apparent that by slotting the top plate in the manner described and by filling the slots with brazing brass or the like, the entire pole and gap assembly may be rigidly and permanently secured together for ease in manufacture and for more conveniently assembling the chuck. At the same time the brazing brass does not interfere with the magnetic properties of the bar pole top chuck plate and the top of the top plate remains perfectly free and smooth, and in addition, every pole and non-magnetic strip is securely fastened in a unitary assembly. This is a considerable advance over constructions in which the poles and strips are merely bolted together, as by bolting the strips together a certain looseness between them is unavoidable and the strips are not then made into a single unitary body, so that a smooth ground top surface is not obtained.

The top plate as so far described may be easily assembled as a unit with the end pieces 22, preferably by means of a tongue and groove construction as shown at 28. If desired the end pieces may then be further secured as by screws 30 extending into the narrow ends of the top plate. The side pieces 20 are then similarly assembled and rods 32, having nuts 34 threaded to the ends thereof, may be utilized to secure the side pieces to the top plate. By this means, as above described, a unitary top plate is provided in which the poles and gaps are permanently secured together to form a unit and the sides and ends are detachably secured thereto as shown.

The top plate may be secured to the walls of housing 10 by bolts or other means, but in cases where it is desired to thread a bolt into the lower surface of the top plate from the chuck body, holes are drilled as at 34 and these holes are filled with brazing brass or other non-magnetic material as shown at 36, after which the non-magnetic material may be tapped out as shown at 38 to provide for receiving bolts or screws or other fasteners which are applied to the body of the chuck.

The above described invention presents a simplified bar pole top plate for a chuck of any type and this top plate is easily and inexpensively manufactured due to its construction; and it provides the further advantage that the poles and pole spacing strips 18 are secured into a single unitary body, the component parts of which are permanently secured together by means which will not affect the operation of the chuck and which lie at the non-working surface only of the top plate so as to leave the working face thereof free and clear for machine operations or for milling out to special conformations.

Having thus described my invention and the advantages thereof, I do not wish to be limited to the details herein disclosed, otherwise than as set forth in the claims, but what I claim is:

1. A rectangular top-plate for a magnetic chuck, said top-plate comprising a plurality of prefabricated alternate thin magnetic and non-magnetic strips extending longitudinally of the top-plate, the outermost strips at each side being non-magnetic, a wider soft iron side piece adjacent and contacting each of the outermost non-magnetic strips, non-magnetic end pieces located transversely of the strips, the strips being provided with a plurality of alined slots forming a channel extending transversely of the strips at the bottom surface only of the plate, non-magnetic fusable metal filling the channel and rigidly binding the strips together in a fixed unit, and means securing the end pieces and side pieces to the assembled strips.

2. The top-plate of claim 1 including a transverse dovetail construction between the ends of the strips and the end pieces to positively locate the latter relative to the former.

GEORGE J. CARSON.

REFERENCES CITED

The following references are of record in the file of this patent:

UNITED STATES PATENTS

| Number | Name | Date |
|---|---|---|
| 1,415,723 | Simmons | May 9, 1922 |
| 1,895,129 | Jones | Jan. 4, 1933 |
| 2,086,164 | Karasick | July 6, 1937 |
| 2,186,074 | Koller | Jan. 9, 1940 |
| 2,327,748 | Smith | Aug. 24, 1943 |

FOREIGN PATENTS

| Number | Country | Date |
|---|---|---|
| 6,139 | Great Britain | 1912 |